United States Patent
Ide (10) Patent No.: US 9,088,321 B2
(45) Date of Patent: Jul. 21, 2015

(54) DIFFERENTIAL TRANSMISSION CIRCUIT AND ELECTRONIC APPARATUS

(71) Applicant: CANON KABUSHIKI KAISHA, Tokyo (JP)

(72) Inventor: Takeshi Ide, Kamakura (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 13/904,354

(22) Filed: May 29, 2013

(65) Prior Publication Data

US 2013/0329831 A1    Dec. 12, 2013

(30) Foreign Application Priority Data

Jun. 6, 2012   (JP) .................................. 2012-128992

(51) Int. Cl.
*H04L 27/00* (2006.01)
*H04B 1/04* (2006.01)

(52) U.S. Cl.
CPC .................................... *H04B 1/0475* (2013.01)

(58) Field of Classification Search
USPC ......... 375/259–260, 285, 295, 296, 316, 350; 333/12, 177, 181, 185, 19; 326/82, 83, 326/86, 115, 26; 327/594
See application file for complete search history.

(56) References Cited

U.S. PATENT DOCUMENTS

| | | | | |
|---|---|---|---|---|
| 2,573,299 | A * | 10/1951 | Bast ........................... | 137/564.5 |
| 7,573,299 | B2 | 8/2009 | Watarai .......................... | 326/83 |
| 2007/0241838 | A1* | 10/2007 | Suzuki .......................... | 333/181 |
| 2007/0252659 | A1* | 11/2007 | Suenaga et al. ................. | 333/32 |
| 2008/0204172 | A1* | 8/2008 | Sakai et al. ................. | 333/22 R |
| 2009/0052485 | A1* | 2/2009 | Aoki .......................... | 372/38.02 |
| 2010/0045418 | A1* | 2/2010 | Nishikawa et al. ........... | 336/192 |
| 2010/0239029 | A1* | 9/2010 | Komori et al. ................ | 375/257 |
| 2011/0074525 | A1* | 3/2011 | Kameya ........................ | 333/181 |
| 2011/0305060 | A1* | 12/2011 | Ichimura et al. ................ | 365/63 |

FOREIGN PATENT DOCUMENTS

JP    2007-324799 A    12/2007

* cited by examiner

*Primary Examiner* — Jean B Corrielus
(74) *Attorney, Agent, or Firm* — Fitzpatrick, Cella, Harper & Scinto (57) ABSTRACT

A first resistor group and second resistor group are respectively made up of at least three resistive elements connected in series and are adapted to shift respectively direct-current voltage levels of a first signal and second signal to voltage levels obtained by dividing a direct-current voltage between a power source line and ground line. A common mode choke coil is installed between the power source line and the first and second resistor groups. The common mode choke coil includes a first coil unit adapted to connect the power source line with one end of the first resistor group, and a second coil unit adapted to connect the power source line with one end of the second resistor group and magnetically coupled to the first coil unit. This suppresses propagation of power source noises of the same phase to the resistor groups.

9 Claims, 11 Drawing Sheets

FIG. 11B

DIFFERENTIAL TRANSMISSION CIRCUIT AND ELECTRONIC APPARATUS

CROSS-REFERENCE TO RELATED APPLICATIONS

This application claims the benefit of Japanese Patent Application No. 2012-128992, filed Jun. 6, 2012, which is hereby incorporated by reference herein in its entirety.

BACKGROUND OF THE INVENTION

1. Field of the Invention

The present invention relates to a differential transmission circuit used to transmit a differential signal including first and second signals of phases opposite to each other as well as to an electronic apparatus equipped with the differential transmission circuit.

2. Description of the Related Art

To achieve high speed and high definition, recent digital copiers and digital cameras need to transmit a large amount of digital signals at high speed. This increases the number of devices performing simultaneous switching in driver ICs adapted to output digital signals as well as the switching frequency of the devices. For stable operation of the large-scale, fast-acting ICs, it is necessary to stabilize a power source voltage supplied to the ICs. For that, a large number of capacitors are placed around the ICs mounted on a printed circuit board, thereby stabilizing the power source voltage of the ICs.

The capacitors and ICs are interconnected via a power source line and ground line on the printed circuit board. Consequently, a high frequency current supplied to the ICs from the capacitors flows to a parasitic inductance component, thereby causing fluctuation of power source potential (power source noise). The power source noise could generate electro magnetic interference (EMI) using a cable or the like connected to the printed circuit board, as an antenna and thereby cause malfunctions of other electronic apparatus. Thus, it is necessary to suppress EMI caused by the power source noise.

On the other hand, for high-speed transmission of digital signals, differential transmission systems which are resistant to extraneous electromagnetic noise and cause less electromagnetic interference are used widely. Also, there are various standards, typical examples of which include PECL (Pseudo-Emitter Coupled Logic), LVDS (Low Voltage Differential Signaling), and PCI-express (Peripheral Component Interconnect).

The differential transmission systems vary in features depending on costs and power consumption as well as on standards including a prescribed signal amplitude and frequency band, and thus there are cases in which transmitting and receiving sides use separate transmission standards according to their respective purposes. Since different signal levels (signal amplitudes and center voltages) are prescribed by different standards, it is necessary to provide a level shift circuit, i.e., a circuit adapted to adjust the signal level of signals output by the transmitting side to the standards of the receiving side.

Conventionally, in the level shift circuit for differential transmission, a resistor group made up of three resistive elements is provided per differential signal line and two resistor groups are installed in parallel between a power source line and ground line for a total of six resistive elements (see Japanese Patent Application Laid-Open No. 2007-324799). In the level shift circuit, by adjusting the value of each resistor connected to the differential signal line, direct-current voltage levels of signals output from the transmitting side can be adjusted to the standards of the receiving side.

However, according to Japanese Patent Application Laid-Open No. 2007-324799 described above, in the level shift circuit, the power source line/ground line is connected directly to the differential signal lines via the resistive elements, and thus power source noise generated on the power source line/ground line propagates to the differential signal lines via the resistive elements in the resistor groups. Furthermore, a positive side and negative side of the differential signal line are connected to the same power source line via the resistive elements of the level shift circuit, causing power source noise to flow equally into the positive side and negative side of the differential signal line from the power source line. Consequently, the power source noises generated on the positive side and negative side of the differential signal line have the same phase. This is also true when power source noise flows in through the ground line. Therefore, there is concern that electromagnetic interference may be radiated using a cable or the like of the differential signal line as an antenna.

SUMMARY OF THE INVENTION

Thus, an object of the present invention is to suppress propagation of power source noise to resistor groups and reduce radiation of electromagnetic noise.

According to an aspect of the present invention, a differential transmission circuit for transmitting a differential signal including first and second signals of phases opposite to each other, comprises a first resistor group made up of at least three resistive elements connected in series and adapted to shift a direct-current voltage level of the first signal to a voltage level obtained by dividing a direct-current voltage between a power source line and ground line, a second resistor group made up of at least three resistive elements connected in series and adapted to shift a direct-current voltage level of the second signal to a voltage level obtained by dividing a direct-current voltage between the power source line and ground line, and a first common mode choke coil including a first coil unit adapted to connect one of the power source and ground lines with one end of the first resistor group and a second coil unit adapted to connect the one of the lines with one end of the second resistor group and magnetically coupled to the first coil unit.

The present invention increases impedance to the in-phase component between one line of the power source and ground lines and the resistor groups, by using the common mode choke coil. This enables suppressing propagation of power source noise generated on one of the lines to the resistor groups and reducing radiation of electromagnetic noise.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings.

(First Embodiment)

Figure 1:
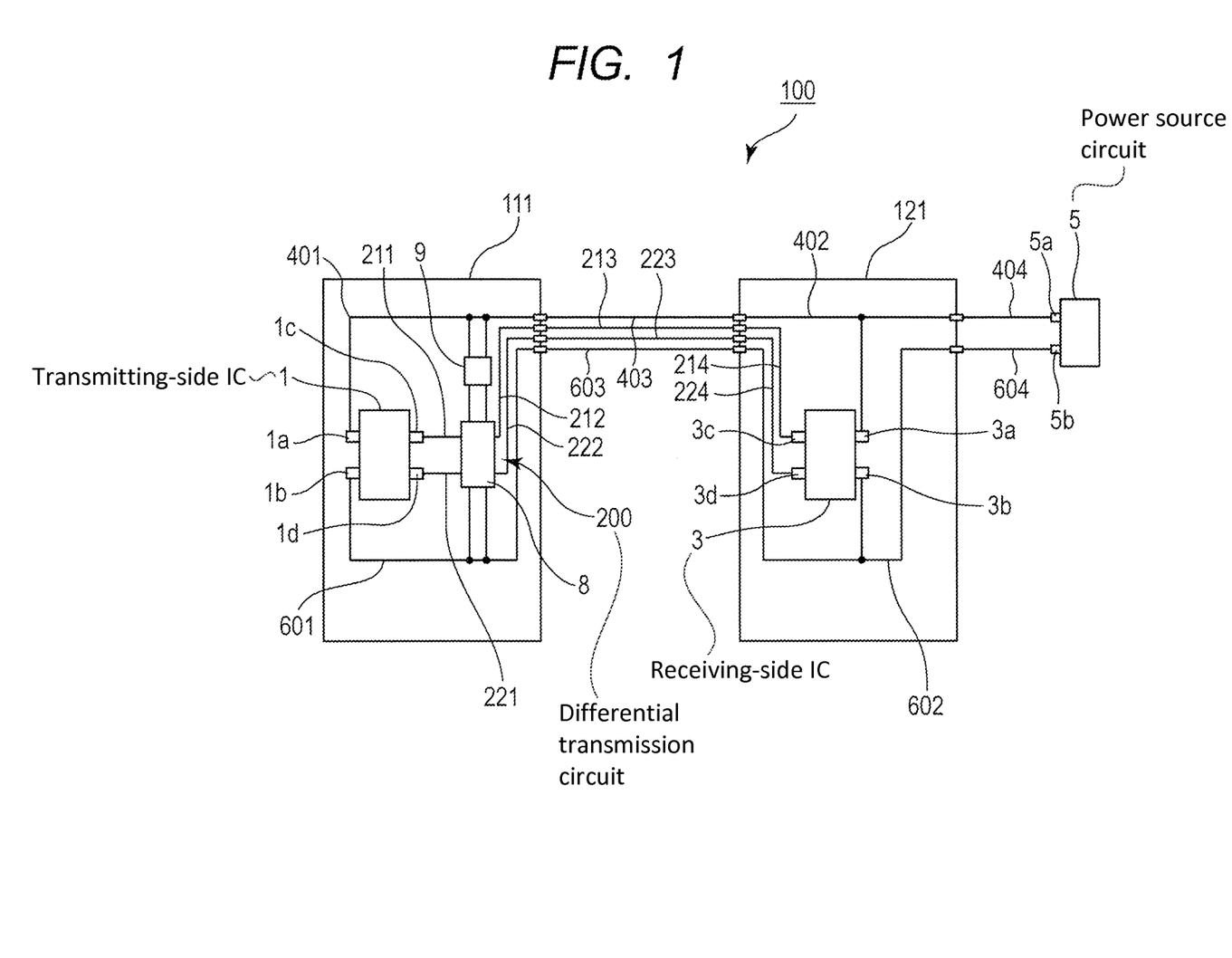
FIG. 1 is a conceptual diagram showing a schematic configuration of an electronic apparatus equipped with a differential transmission circuit according to a first embodiment.

FIG. 1 is an explanatory diagram showing a schematic configuration of an electronic apparatus equipped with a differential transmission circuit according to a first embodiment. The electronic apparatus 100 is, for example, a copier, a printer, a facsimile machine, a multi-function peripheral thereof, or a digital camera. The electronic apparatus 100 includes a transmitting-side IC 1 serving as a transmitting circuit adapted to send a differential signal, a receiving-side IC 3 serving as a receiving circuit adapted to receive a differential signal, a differential transmission circuit 200 installed on a transmission line for the differential signal, and a direct-current power source circuit 5. The electronic apparatus 100 also includes a first printed circuit board 111 on which the transmitting-side IC 1 is mounted and a second printed circuit board on which the receiving-side IC 3 is mounted. The differential signal is a digital signal made up of a first signal and second signal of opposite phase. The transmitting-side IC 1 and receiving-side IC 3 differ in direct-current voltage level serving as a reference. The transmitting-side IC 1 outputs the first signal and second signal by superimposing the first signal and second signal on a direct-current voltage at a first direct-current voltage level. On the other hand, the receiving-side IC 3 is configured to be able to receive the first signal and second signal based on a second direct-current voltage level different from the first direct-current voltage level.

The differential transmission circuit 200 includes a level shift circuit 8 and a common mode choke coil (first common mode choke coil) 9. The level shift circuit 8 is designed to produce output by converting the direct-current voltage level of the differential signal from the first direct-current voltage level into the second direct-current voltage level. The level shift circuit 8 and common mode choke coil 9 are mounted on the first printed circuit board 111.

The transmitting-side IC 1 includes a power source terminal 1a, a ground terminal b, and two signal transmitting terminals 1c and 1d (first signal transmitting terminal 1c and second signal transmitting terminal 1d). The first signal of the differential signal is sent from the first signal transmitting terminal 1c. The second signal of the differential signal is sent from the second signal transmitting terminal 1d. The receiving-side IC 3 includes a power source terminal 3a, a ground terminal 3b, and two signal receiving terminals 3c and 3d (first signal receiving terminal 3c and second signal receiving terminal 3d). The first signal is received through the first signal receiving terminal 3c and the second signal is received through the second signal receiving terminal 3d.

A power source line pattern 401, a ground line pattern 601, a first wiring pattern 211 and second wiring pattern 212 for the first signal, and a third wiring pattern 221 and fourth wiring pattern 222 for the second signal are formed on the first printed circuit board 111. Incidentally, the printed circuit board 111 may be either a mono-layer substrate or multi-layer substrate while the lines may be formed only on a surface layer or may be formed either on the surface layer or in an inner layer. Also, the ground line pattern 601 may be formed as a plane pattern on the surface layer or in the inner layer.

The power source line pattern 401 is electrically connected to the power source terminal 1a of the transmitting-side IC 1. The ground line pattern 601 is electrically connected to the ground terminal 1b of the transmitting-side IC 1. The first wiring pattern 211 for the first signal is electrically connected to the first signal transmitting terminal 1c of the transmitting-side IC 1 and to the level shift circuit 8 while the second wiring pattern 212 is electrically connected to the level shift circuit 8. The third wiring pattern 221 for the second signal is electrically connected to the second signal transmitting terminal 1d of the transmitting-side IC 1 and to the level shift circuit 8 while the fourth wiring pattern 222 is electrically connected to the level shift circuit 8.

A power source line pattern 402, a ground line pattern 602, a fifth wiring pattern 214, and a sixth wiring pattern 224 are formed on the second printed circuit board 121. Incidentally, the printed circuit board 121 may be either a mono-layer substrate or multi-layer substrate while the lines may be formed only on a surface layer or may be formed either on the surface layer or in an inner layer. Also, the ground line pattern 602 may be formed as a plane pattern on the surface layer or in the inner layer.

A power source line pattern 402 is electrically connected to the power source terminal 3a of the receiving-side IC 3. The ground line pattern 602 is electrically connected to the ground terminal 3b of the receiving-side IC 3. The fifth wiring pattern 214 for the first signal is electrically connected to the first signal receiving terminal 3c of the receiving-side IC 3. The sixth wiring pattern 224 for the second signal is electrically connected to the second signal receiving terminal 3d of the receiving-side IC 3.

The first printed circuit board 111 and second printed circuit board 121 are interconnected by a cable and the second printed circuit board 121 and direct-current power source circuit 5 are interconnected by a cable. Incidentally, the direct-current power source circuit 5 may be mounted on the first printed circuit board 111 or second printed circuit board 121.

Described specifically below, one end of a power source cable 403 is electrically connected to the power source line pattern 401 of the first printed circuit board 111 and another end is electrically connected to the power source line pattern 402 of the second printed circuit board 121. Furthermore, one end of a power source cable 404 is electrically connected to the power source line pattern 402 of the second printed circuit board 121 and another end is electrically connected to a positive terminal 5a of the direct-current power source circuit 5. That is, the positive terminal 5a of the direct-current power source circuit 5 is electrically connected to the power source terminal 3a of the receiving-side IC 3 via the power source cable 404 and power source line pattern 402. Also, the positive terminal 5a of the direct-current power source circuit 5 is electrically connected to the power source terminal 1a of the transmitting-side IC 1 via the power source cable 404, power source line pattern 402, power source cable 403 and power source line pattern 401.

Also, one end of a ground cable 603 is electrically connected to the ground line pattern 601 of the first printed circuit board 111 and another end is electrically connected to the ground line pattern 602 of the second printed circuit board 121. Furthermore, one end of a ground cable 604 is electrically connected to the ground line pattern 602 of the second printed circuit board 121 and another end is electrically connected to a negative terminal 5b of the direct-current power source circuit 5. That is, the negative terminal 5b of the direct-current power source circuit 5 is electrically connected to the ground terminal 3b of the receiving-side IC 3 via the ground cable 604 and ground line pattern 602. Also, the negative terminal 5b of the direct-current power source circuit 5 is electrically connected to the ground terminal 1b of the transmitting-side IC 1 via the ground cable 604, ground line pattern 602, ground cable 603 and ground line pattern 601.

Also, one end of a first signal cable 213 is electrically connected to the second wiring pattern 212 of the first printed circuit board 111 and another end is electrically connected to the fifth wiring pattern 214 of the second printed circuit board 121. Consequently, the first signal sent from the first signal transmitting terminal 1c is transmitted to the first signal receiving terminal 3c via the first wiring pattern 211, level shift circuit 8, second wiring pattern 212, first signal cable 213 and fifth wiring pattern 214.

Also, one end of a second signal cable 223 for the second signal is electrically connected to the fourth wiring pattern 222 on the first printed circuit board 111 and another end is electrically connected to the sixth wiring pattern 224 for the second signal on the second printed circuit board 121. Consequently, the second signal sent from the second signal transmitting terminal 1d is transmitted to the second signal receiving terminal 3d via the third wiring pattern 221, level shift circuit 8, fourth wiring pattern 222, second signal cable 223 and sixth wiring pattern 224.

Figure 2:
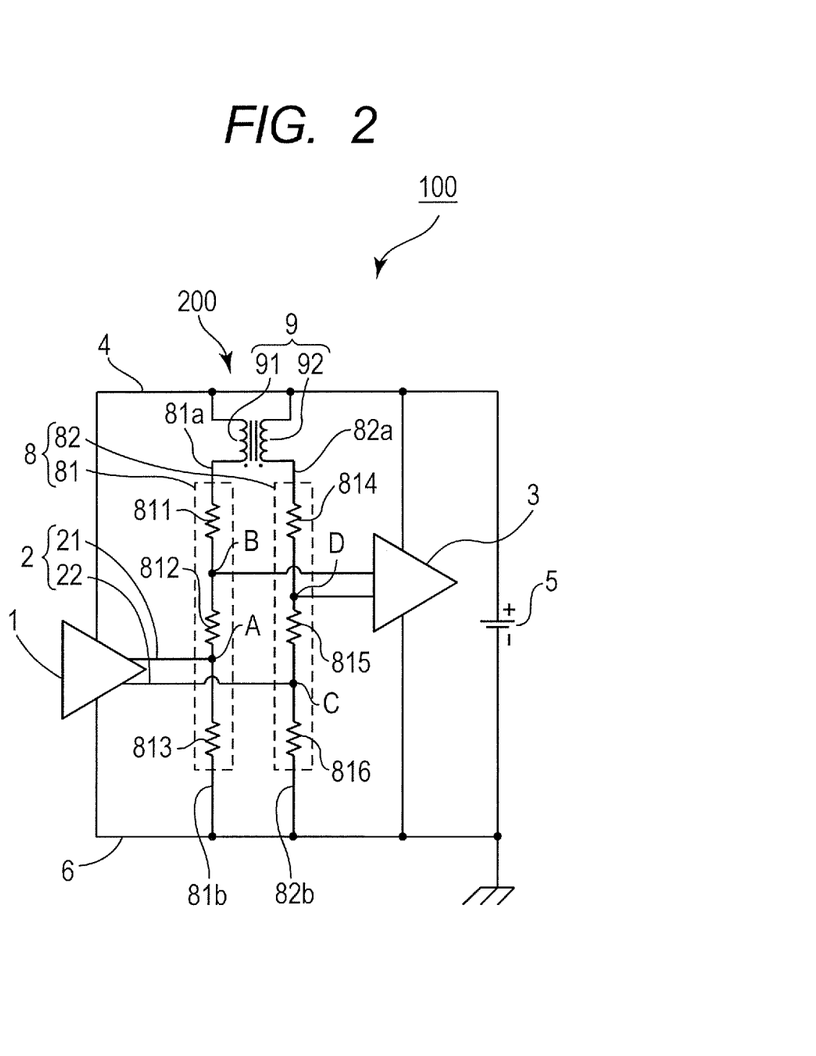
FIG. 2 is a circuit diagram showing a circuit configuration of the electronic apparatus equipped with the differential transmission circuit according to the first embodiment.

FIG. 2 is an electric circuit diagram showing a circuit configuration of the electronic apparatus equipped with the differential transmission circuit according to the first embodiment. According to the first embodiment, a power source line 4 shown in FIG. 2 includes the power source line pattern 401, power source cable 403, power source line pattern 402 and power source cable 404 shown in FIG. 1. Also, a ground line 6 shown in FIG. 2 includes the ground line pattern 601, ground cable 603, ground line pattern 602 and ground cable 604 shown in FIG. 1. Also, a first signal line 21 shown in FIG. 2 includes the first wiring pattern 211 and second wiring pattern 212 for the first signal, first signal cable 213 for the first signal, and fifth wiring pattern 214 for the first signal, shown in FIG. 1. Incidentally, the first wiring pattern 211 and second wiring pattern 212 are interconnected via a first resistive element 812 of a differential transmission circuit 200 described later with reference to FIG. 2. Also, a second signal line 22 shown in FIG. 2 includes the third wiring pattern 221 and fourth wiring pattern 222 for the second signal, second signal cable 223 for the second signal, and sixth wiring pattern 224 for the second signal, shown in FIG. 1. Incidentally, the third wiring pattern 221 and fourth wiring pattern 222 for the second signal are interconnected via a fourth resistive element 815 of the differential transmission circuit 200 described later. Then, the first signal line 21 and second signal line 22 make up a differential signal line 2.

The level shift circuit 8 includes a first resistor group 81 and a second resistor group 82. The first resistor group 81 is made up of a second resistive element 811, first resistive element 812, and third resistive element 813 connected in series while the second resistor group 82 is made up of a fifth resistive element 814, fourth resistive element 815, and sixth resistive element 816 connected in series.

The first wiring pattern 211 (FIG. 1) of the differential signal line 2 is connected to a node A between the first resistive element 812 and third resistive element 813 of the first resistor group 81. Also, the second wiring pattern 212 (FIG. 1) is connected to a node B between the second resistive element 811 and first resistive element 812. Consequently, the direct-current voltage level of the first signal entering the first resistor group 81 through the first wiring pattern 211 is stepped up from the first direct-current voltage level at the node A to the second direct-current voltage level at the node B, where the first direct-current voltage level is obtained by dividing a direct-current voltage between the power source line 4 and ground line 6. Then, the first signal is output to the first signal receiving terminal 3c of the receiving-side IC 3 through the second wiring pattern 212, first signal cable 213, and fifth wiring pattern 214. In this way, the first resistor group 81 shifts the direct-current voltage level of the first signal to the voltage level obtained by dividing the direct-current voltage between the power source line 4 and ground line 6.

Also, the third wiring pattern 221 (FIG. 1) of the differential signal line 2 is connected to a node C between the fourth resistive element 815 and sixth resistive element 816 of the second resistor group 82. Also, the fourth wiring pattern 222 (FIG. 1) is connected to a node D between the fifth resistive element 814 and fourth resistive element 815. Consequently, the direct-current voltage level of the second signal entering the second resistor group 82 through the third wiring pattern 221 is stepped up from the first direct-current voltage level at the node C to the second direct-current voltage level at the node D, where the first direct-current voltage level is obtained by dividing a direct-current voltage between the power source line 4 and ground line 6. Then, the second signal is output to the second signal receiving terminal 3d of the receiving-side IC 3 through the fourth wiring pattern 222, second signal cable 223 and sixth wiring pattern 224. In this way, the second resistor group 82 shifts the direct-current voltage level of the second signal to the voltage level obtained by dividing the direct-current voltage between the power source line 4 and ground line 6.

Thus, the differential signal sent from the transmitting-side IC 1 has its voltage level shifted by the level shift circuit 8 and is then transmitted to, and received by, the receiving-side IC 3.

According to the first embodiment, the common mode choke coil 9 is arranged between the power source line 4 and level shift circuit 8 as shown in FIG. 2. The common mode choke coil 9 includes a first coil unit 91 and second coil unit 92, where the first coil unit 91 is adapted to connect the power source line 4, which is one of lines, with one end 81a of the first resistor group 81 while the second coil unit 92 is adapted to connect the power source line 4 with one end 82a of the second resistor group 82. Described specifically, one end of the first coil unit 91 is electrically connected to the power source line 4 while the other end of the first coil unit 91 is electrically connected to one end 81a of the first resistor group 81. Also, one end of the second coil unit 92 is electrically connected to the power source line 4 while the other end of the second coil unit 92 is electrically connected to one end 82a of the second resistor group 82. In this way, one end 81a of the first resistor group 81 is connected to the power source line 4 via the first coil unit 91 while one end 82a of the second resistor group 82 is connected to the power source line 4 via the second coil unit 92.

The first coil unit 91 and second coil unit 92 are magnetically coupled to each other and are wound in a same direction. Another end 81b of the first resistor group 81 is electrically connected to the ground line 6 and another end 82b of the second resistor group 82 is electrically connected to the ground line 6.

The power source noise (fluctuation of power source potential) generated on the power source line 4 propagates to the coil units 91 and 92 in the same phase, and according to the first embodiment, the pair of coil units 91 and 92 make up the common mode choke coil 9. Therefore, the coil units 91 and 92 of the common mode choke coil 9 have high impedance to noises of the same phase.

Propagation of the power source noise generated on the power source line 4 to the resistor groups 81 and 82 is suppressed by the common mode choke coil 9 which exhibits high impedance. This reduces the noise propagating to the differential signal line 2 via the resistor groups 81 and 82 and thereby reduces the electromagnetic noise radiated from the cables 213 and 223.

(Second Embodiment)

Figure 3:
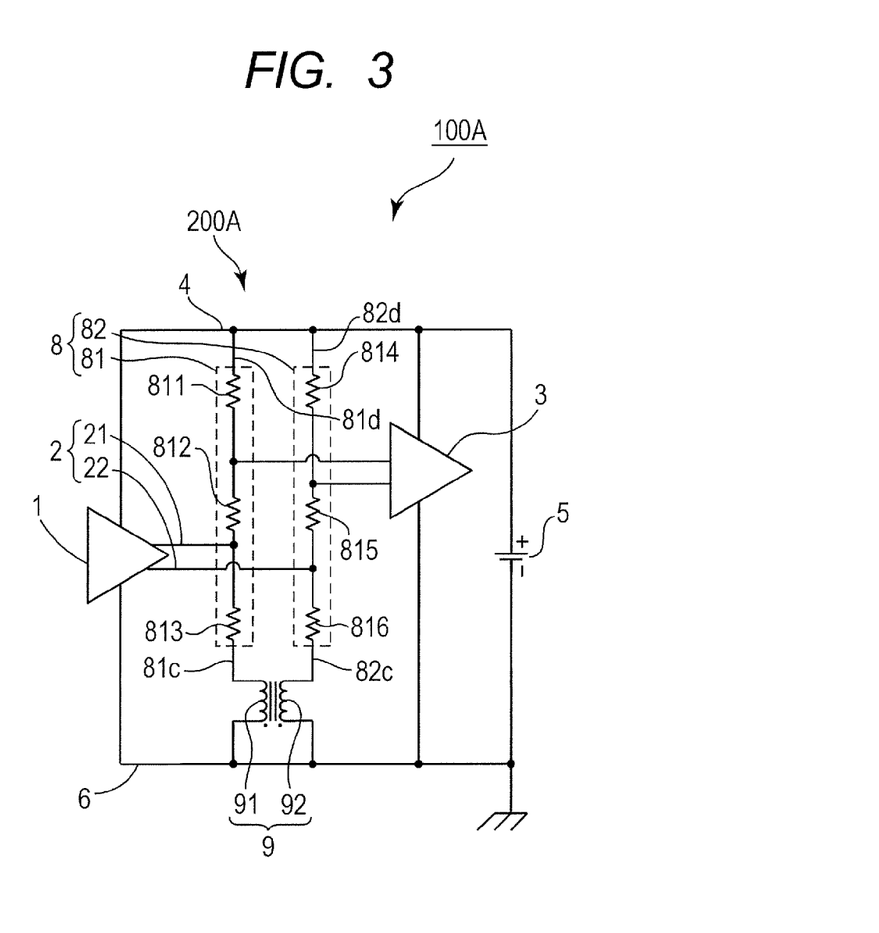
FIG. 3 is a circuit diagram showing a circuit configuration of an electronic apparatus equipped with a differential transmission circuit according to a second embodiment.

Next, an electronic apparatus equipped with a differential transmission circuit according to a second embodiment will be described. FIG. 3 is an electric circuit diagram showing a circuit configuration of the electronic apparatus 100A equipped with the differential transmission circuit 200A according to the second embodiment. In the second embodiment, the same components as those in the first embodiment described above are denoted by the same reference numerals as the corresponding components in the first embodiment, and description thereof will be omitted.

According to the first embodiment described above, the common mode choke coil 9 is arranged between the power source line 4 and level shift circuit 8. According to the second embodiment, the common mode choke coil 9 is arranged between the ground line 6 and level shift circuit 8 as shown in FIG. 3. The common mode choke coil 9 includes a first coil unit 91 and second coil unit 92, where the first coil unit 91 is adapted to connect the ground line 6, which is one of lines, with one end 81c of the first resistor group 81 while the second coil unit 92 is adapted to connect the ground line 6 with one end 82c of the second resistor group 82.

Described specifically, one end of the first coil unit 91 is electrically connected to the ground line 6 while the other end of the first coil unit 91 is electrically connected to one end 81c of the first resistor group 81. Also, one end of the second coil unit 92 is electrically connected to the ground line 6 while the other end of the second coil unit 92 is electrically connected to one end 82c of the second resistor group 82. In this way, one end 81c of the first resistor group 81 is connected to the ground line 6 via the first coil unit 91 while one end 82c of the second resistor group 82 is connected to the ground line 6 via the second coil unit 92.

The first coil unit 91 and second coil unit 92 are magnetically coupled to each other and are wound in a same direction. Another end 81d of the first resistor group 81 and another end 82d of the second resistor group 82 are electrically connected to the power source line 4.

The power source noise (fluctuation of power source potential) generated on the ground line 6 propagates to the coil units 91 and 92 in the same phase, and according to the second embodiment, the pair of coil units 91 and 92 make up the common mode choke coil 9. Therefore, the coil units 91 and 92 of the common mode choke coil 9 have high impedance to noises of the same phase.

Propagation of the power source noise generated on the ground line 6 to the resistor groups 81 and 82 is suppressed by the common mode choke coil 9 which exhibits high impedance. This reduces the power source noise propagating to the differential signal line 2 via the resistor groups 81 and 82 and thereby reduces the electromagnetic noise radiated from the cables 213 and 223.

(Third Embodiment)

Figure 4:
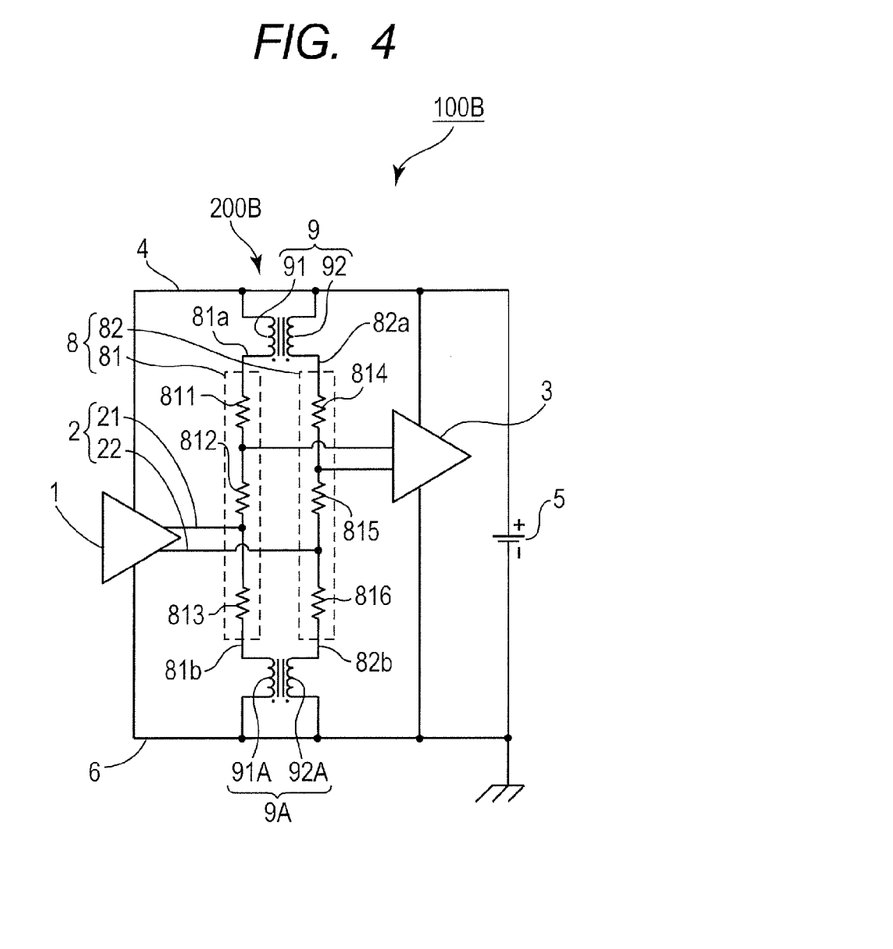
FIG. 4 is a circuit diagram showing a circuit configuration of an electronic apparatus equipped with a differential transmission circuit according to a third embodiment.

Next, an electronic apparatus equipped with a differential transmission circuit according to a third embodiment will be described. FIG. 4 is an electric circuit diagram showing a circuit configuration of the electronic apparatus 100B equipped with the differential transmission circuit 200B according to the third embodiment. In the third embodiment, the same components as those in the first embodiment described above are denoted by the same reference numerals as the corresponding components in the first embodiment, and description thereof will be omitted.

The differential transmission circuit 200B of the electronic apparatus 100B according to the third embodiment includes a level shift circuit 8 and two common mode choke coils 9 and 9A. The first common mode choke coil 9 is arranged between the power source line 4 and level shift circuit 8 as with the first embodiment described above.

The second common mode choke coil 9A is arranged between the ground line 6 and level shift circuit 8. The second common mode choke coil 9A includes a third coil unit 91A and fourth coil unit 92A, where the third coil unit 91A is adapted to connect the ground line 6, which is another line, with the other end 81b of the first resistor group 81 while the fourth coil unit 92A is adapted to connect the ground line 6 with the other end 82b of the second resistor group 82.

Described specifically, one end of the third coil unit 91A is electrically connected to the ground line 6 while the other end of the third coil unit 91A is electrically connected to the other end 81b of the first resistor group 81. Also, one end of the fourth coil unit 92A is electrically connected to the ground line 6 while the other end of the fourth coil unit 92A is electrically connected to the other end 82b of the second resistor group 82. In this way, the other end 81b of the first resistor group 81 is connected to the ground line 6 via the third coil unit 91A while the other end 82b of the second resistor group 82 is connected to the ground line 6 via the fourth coil unit 92A. The third coil unit 91A and fourth coil unit 92A are magnetically coupled to each other and are wound in a same direction.

The power source noise (fluctuation of power source potential) generated on the power source line 4 propagates to the coil units 91 and 92 in the same phase, and according to the third embodiment, the pair of coil units 91 and 92 make up the common mode choke coil 9. Therefore, the coil units 91 and 92 of the first common mode choke coil 9 have high impedance to noises of the same phase.

On the other hand, the power source noise (fluctuation of power source potential) generated on the ground line 6 propagates to the coil units 91A and 92A in the same phase, and according to the third embodiment, the pair of coil units 91A and 92A make up the common mode choke coil 9A. Therefore, the coil units 91A and 92A of the second common mode choke coil 9A have high impedance to noises of the same phase.

Propagation of the power source noise generated on the power source line 4 to the resistor groups 81 and 82 is suppressed by the first common mode choke coil 9 which exhibits high impedance. Also, propagation of the power source noise generated on the ground line 6 to the resistor groups 81 and 82 is suppressed by the second common mode choke coil 9A which exhibits high impedance. This effectively reduces the noise propagating to the differential signal line 2 via the resistor groups 81 and thereby effectively reduces the electromagnetic noise radiated from the cables 213 and 223.

(Fourth Embodiment)

Figure 5:
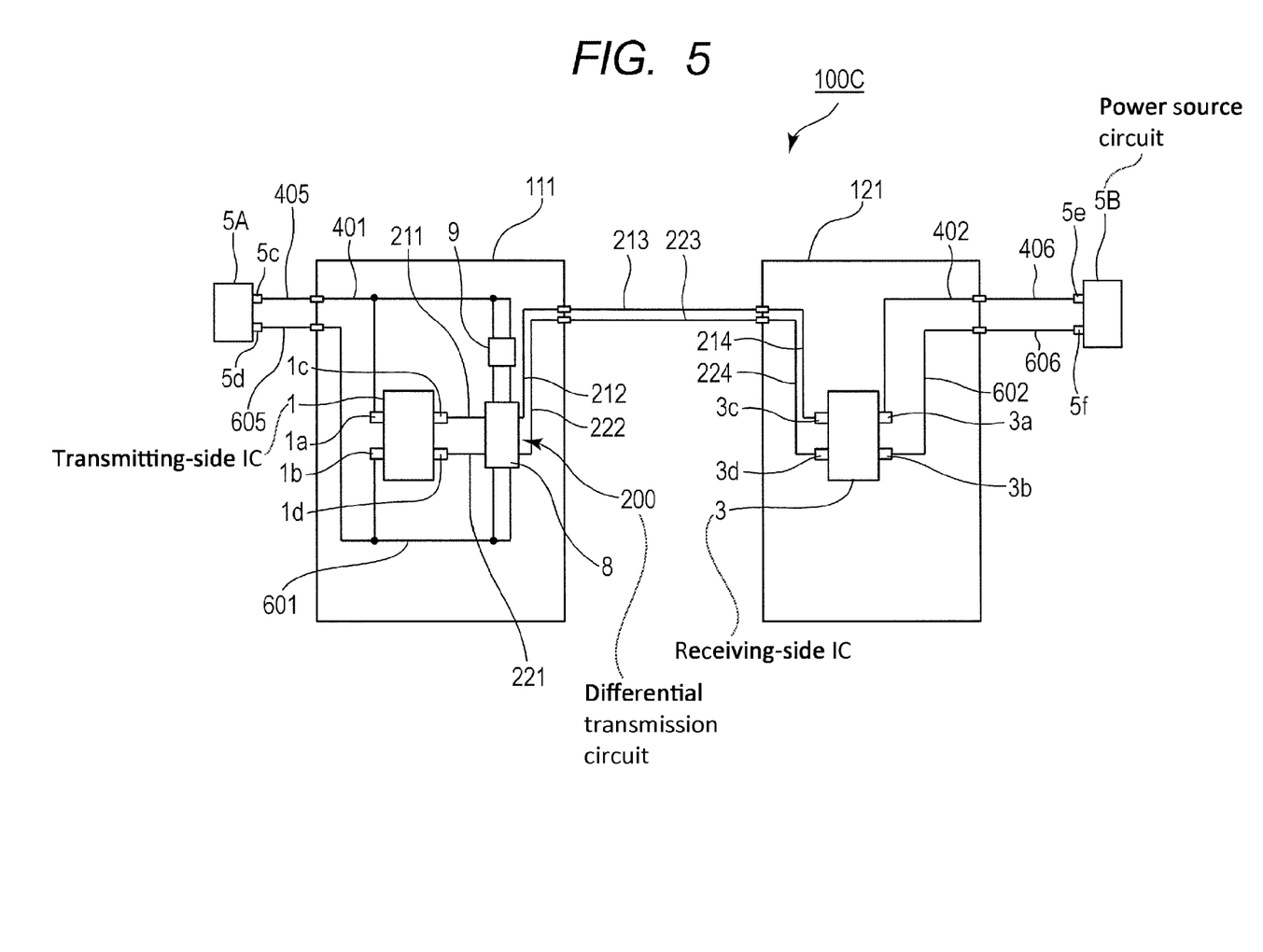
FIG. 5 is a conceptual diagram showing a schematic configuration of an electronic apparatus equipped with a differential transmission circuit according to a fourth embodiment.

Next, an electronic apparatus equipped with a differential transmission circuit according to a fourth embodiment will be described. FIG. 5 is an explanatory diagram showing a schematic configuration of the electronic apparatus equipped with the differential transmission circuit according to the fourth embodiment. Whereas in the first to third embodiments described above, the transmitting-side IC 1 and receiving-side IC 3 draw power from the same direct-current power source circuit 5, a case in which the ICs 1 and 3 draw power from separate direct-current power source circuits will be described in the fourth embodiment. In the fourth embodiment, the same components as those in the first embodiment described above are denoted by the same reference numerals as the corresponding components in the first embodiment, and description thereof will be omitted.

According to the fourth embodiment, the electronic apparatus 100C is equipped with a first direct-current power source circuit 5A and second direct-current power source circuit 5B. The first direct-current power source circuit 5A is connected to the first printed circuit board 111 and the second direct-current power source circuit 5B is connected to the second printed circuit board 121.

Specifically, a positive terminal 5c of the first direct-current power source circuit 5A is electrically connected to the power source line pattern 401 of the first printed circuit board 111 via a power source cable 405. Also, a negative terminal 5d of the first direct-current power source circuit 5A is electrically connected to the ground line pattern 601 of the first printed circuit board 111 via a ground cable 605. Consequently, the transmitting-side IC 1 is supplied with electric power from the first direct-current power source circuit 5A. Incidentally, the direct-current power source circuit 5A may be mounted on the first printed circuit board 111.

A positive terminal 5e of the second direct-current power source circuit 5B is electrically connected to the power source line pattern 402 of the second printed circuit board 121 via a power source cable 406. Also, a negative terminal 5f of the second direct-current power source circuit 5B is electrically connected to the ground line pattern 602 of the second printed circuit board 121 via a ground cable 606. Consequently, the receiving-side IC 3 is supplied with electric power from the second direct-current power source circuit 5B. Incidentally, the direct-current power source circuit 5B may be mounted on the second printed circuit board 121.

With the above configuration, according to the fourth embodiment, as with the first embodiment described above, propagation of power source noise to the resistor groups 81 and 82 is suppressed by the common mode choke coil 9 which exhibits high impedance. This reduces the noise propagating to the differential signal line 2 via the resistor groups 81 and 82 and thereby reduces the electromagnetic noise radiated from the cables 213 and 223.

Also, the transmitting-side IC 1 on the first printed circuit board 111 and the receiving-side IC 3 on the second printed circuit board 121 are supplied with electric power separately from the respective direct-current power source circuits 5A and 5B. This eliminates the need to interconnect the first printed circuit board 111 and second printed circuit board 121 by a power source cable and ground cable. This prevents power source noise from propagating via a power source cable and ground cable.

Although in the fourth embodiment, the common mode choke coil 9 is arranged between the power source line 4 and level shift circuit 8, this is not restrictive. The common mode choke coil 9 may be arranged between the ground line 6 and level shift circuit 8 as with the second embodiment described above or two common mode choke coils may be provided as with the third embodiment described above.

EXAMPLES

Example 1

Figure 6:
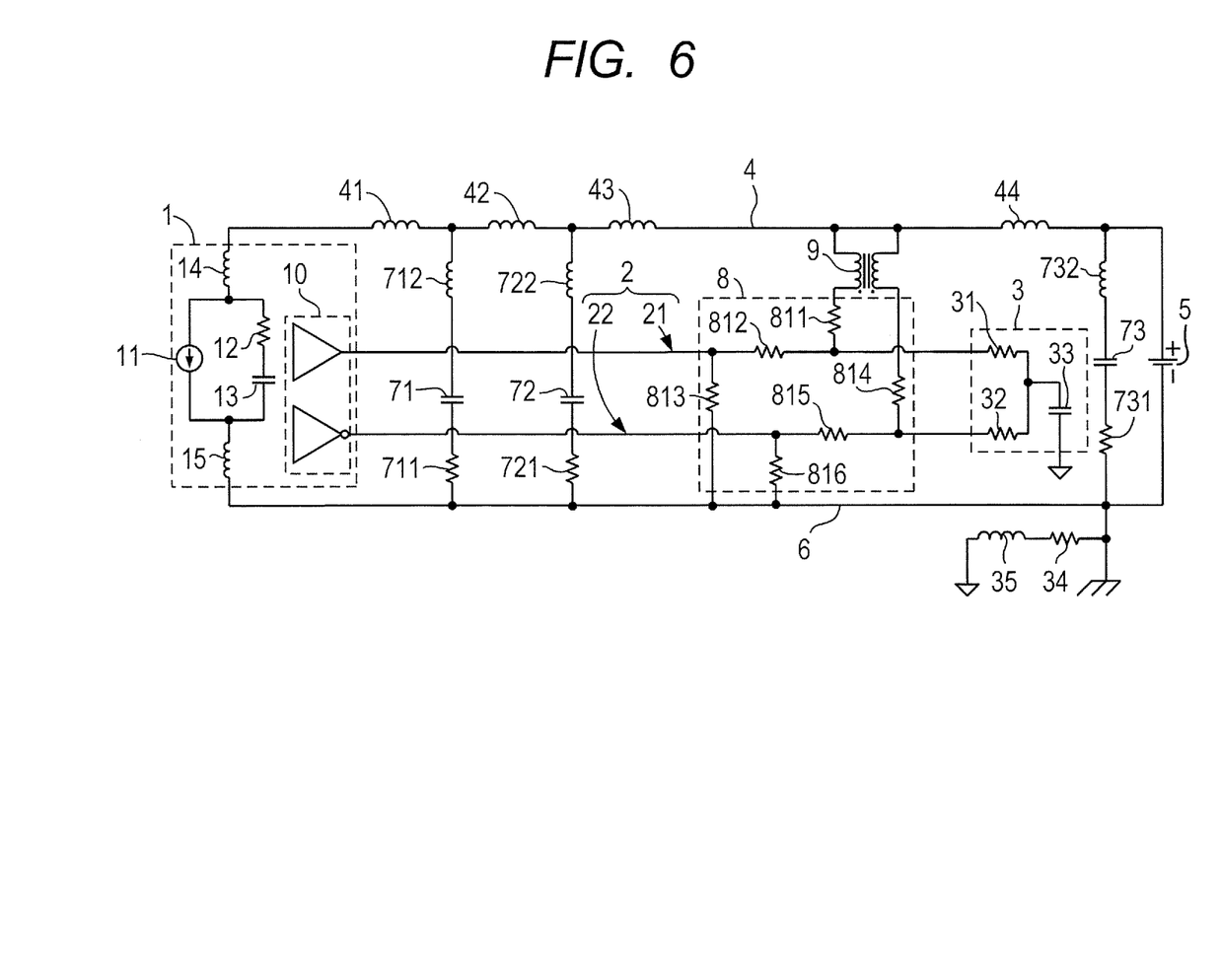
FIG. 6 is an electric circuit diagram showing a circuit model of an electronic apparatus of example 1.

FIG. 6 is an electric circuit diagram showing a circuit model of an electronic apparatus of example 1. The circuit model of example 1 is a result of modeling an electric circuit of the electronic apparatus according to the first embodiment described above. Results of a circuit simulation performed using the circuit model shown in FIG. 6 will be described below. HSPICE from Synopsys Inc. was used for the simulation. The circuit model shown in FIG. 6 is about the same as the electric circuit shown in FIG. 1, and only the differences from the configuration in FIG. 1 will be described.

A buffer model 10 of a commercially available differential signal driver IC was used as the transmitting-side IC 1 while as the receiving-side IC 3, a model built from resistors 31 and 32 and a capacitor 33 was connected to the ground line 6 via parasitic resistance 34 and parasitic inductance 35 of the ground line.

Also, assuming that power source noise was generated by a drive current for the transmitting-side IC 1, a current source 11 as well as a resistor 12 and capacitor adapted to provide output impedance were arranged between the power source line 4 and ground line 6. These components were connected to the power source line 4 and ground line 6 via power-source-side parasitic inductance 14 and ground-side parasitic inductance 15 in a package of the transmitting-side IC 1.

Furthermore, bypass capacitors 71, 72 and 73 adapted to drive the transmitting-side IC 1 were arranged between the power source line 4 and ground line 6. The bypass capacitors modeled parasitic resistances 711, 721 and 731 and parasitic inductances 712, 722 and 732, respectively.

Also, parasitic inductances 41, 42, 43 and 44 of the power source line 4 were modeled assuming that the power source line 4 was formed as wiring patterns. Incidentally, it was assumed that the parasitic inductance of the ground line 6 was negligible. A commercially available SPICE model was used as the common mode choke coil 9. Parameter values of the models are shown in Table 1. Of the parameters in Table 1, an input rise time tr is the time required for an amplitude of a digital signal with a frequency f to change from 0A to 1A while a fall time tf is the time required to change from 1A to 0A. Power source noise is simulated using a digital signal.

TABLE 1

| Code No. | Parameter value |
|---|---|
| 11 | I = 10 A |
|  | tr = 1 ns |
|  | tf = 2 ns |
|  | f = 100 MHz |
| 12 | 0.5 ohm |
| 13 | 5 nF |
| 14 | 0.5 nH |
| 15 | 0.5 nH |
| 31 | 50 ohm |
| 32 | 50 ohm |
| 33 | 0.01 uF |
| 34 | 50 mohm |
| 35 | 0.5 nH |
| 41 | 1 nH |

TABLE 1-continued

| Code No. | Parameter value |
|---|---|
| 42 | 0.5 nN |
| 43 | 0.1 nH |
| 44 | 4 nH |
| 61 | 1 nH |
| 62 | 0.5 nH |
| 63 | 0.1 nH |
| 64 | 4 nH |
| 71 | 0.1 uF |
| 72 | 0.01 uF |
| 73 | 1 uF |
| 711 | 30 mohm |
| 721 | 30 mohm |
| 731 | 1 ohm |
| 712 | 1.5 nH |
| 722 | 1.5 nH |
| 732 | 2 nH |
| 811 | 180 ohm |
| 812 | 75 ohm |
| 813 | 62 ohm |
| 814 | 180 ohm |
| 815 | 75 ohm |
| 816 | 62 ohm |

Figure 7A:
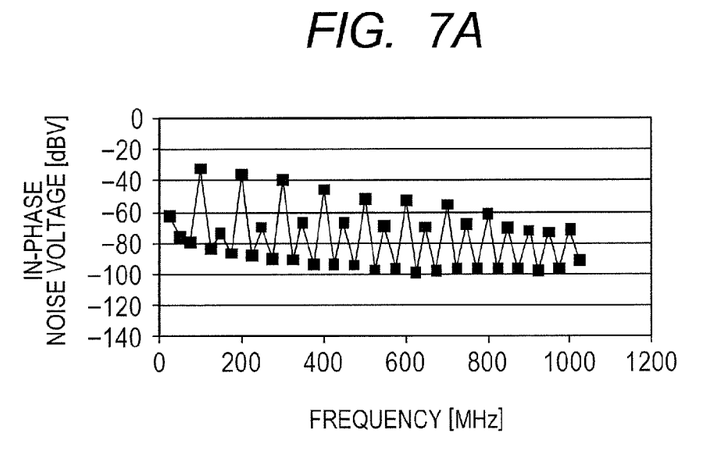
FIGS. 7A and 7B are graphs showing in-phase noise voltage vs. frequency in the circuit model of example 1.
Figure 7B:
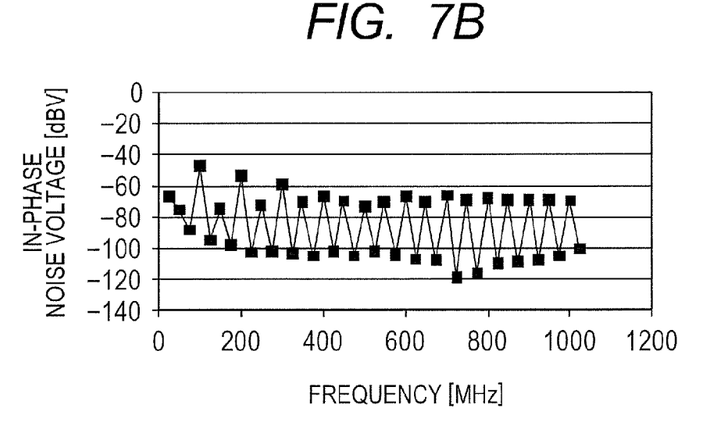

In the circuit model, voltage spectra of in-phase components appearing on the differential signal line 2 were compared between when the common mode choke coil 9 shown in FIG. 6 was installed and when the common mode choke coil 9 in FIG. 6 was not installed. Results are shown in FIGS. 7A and 7B, in which the abscissa represents the frequency while the ordinate represents the noise voltage of the in-phase component in the resistors 31 and 32. FIG. 7A shows results obtained when the common mode choke coil 9 was not installed and FIG. 7B shows results obtained when the common mode choke coil 9 was installed. When the common mode choke coil 9 was installed, peaks of power source noise at integral multiples of 100 MHz were reduced by approximately 20 dB.

Example 2

Figure 8:
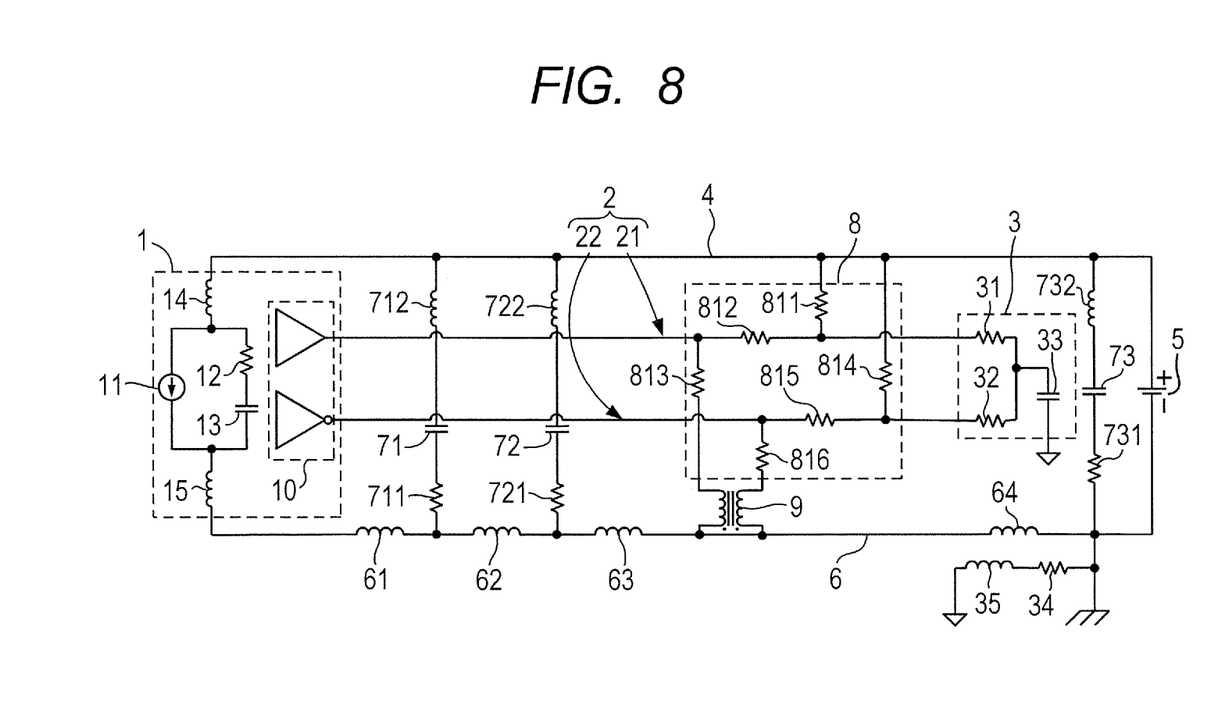
FIG. 8 is an electric circuit diagram showing a circuit model of an electronic apparatus of example 2.

FIG. 8 is an electric circuit diagram showing a circuit model of an electronic apparatus of example 2. The circuit model of example 2 is a result of modeling an electric circuit of the electronic apparatus according to the second embodiment described above. Results of a circuit simulation performed using the circuit model shown in FIG. 8 will be described below. HSPICE was used for the simulation, as in the case of example 1. Regarding the configuration of the circuit model shown in FIG. 8, only the differences from the configuration of the circuit model shown in FIG. 6 will be described.

In example 2, parasitic inductances 61, 62, 63 and 64 of the ground line 6 were modeled assuming that the ground line 6 was formed as wiring patterns. Incidentally, it was assumed that the parasitic inductance of the power source line 4 was negligible.

Figure 9A:
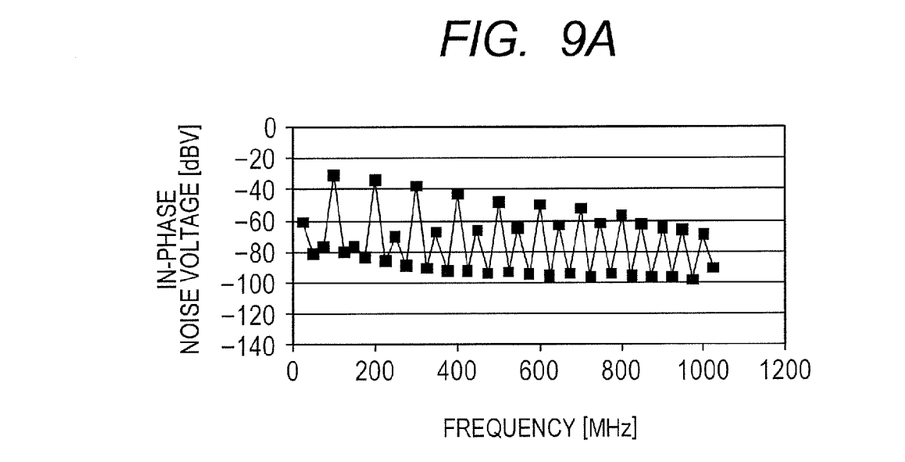
FIGS. 9A and 9B are graphs showing in-phase noise voltage vs. frequency in the circuit model of example 2.
Figure 9B:
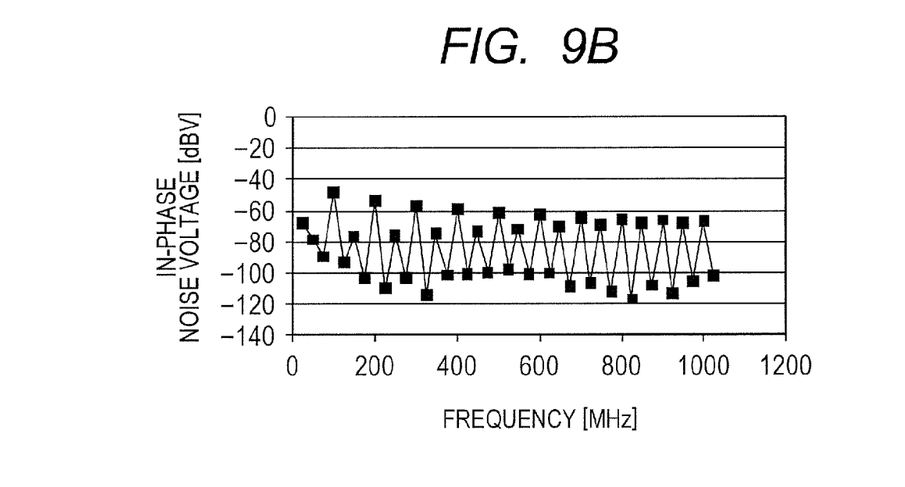

In the circuit model, voltage spectra of in-phase components appearing on the differential signal line 2 were compared between when the common mode choke coil 9 shown in FIG. 8 was installed and when the common mode choke coil 9 in FIG. 8 was not installed. Results are shown in FIGS. 9A and 9B, in which the abscissa represents the frequency while the ordinate represents the noise voltage of the in-phase component in the resistors 31 and 32. FIG. 9A shows results obtained when the common mode choke coil 9 was not installed and FIG. 9B shows results obtained when the common mode choke coil 9 was installed. When the common mode choke coil 9 was installed, peaks of power source noise at integral multiples of 100 MHz were reduced by approximately 20 dB.

Example 3

Figure 10:
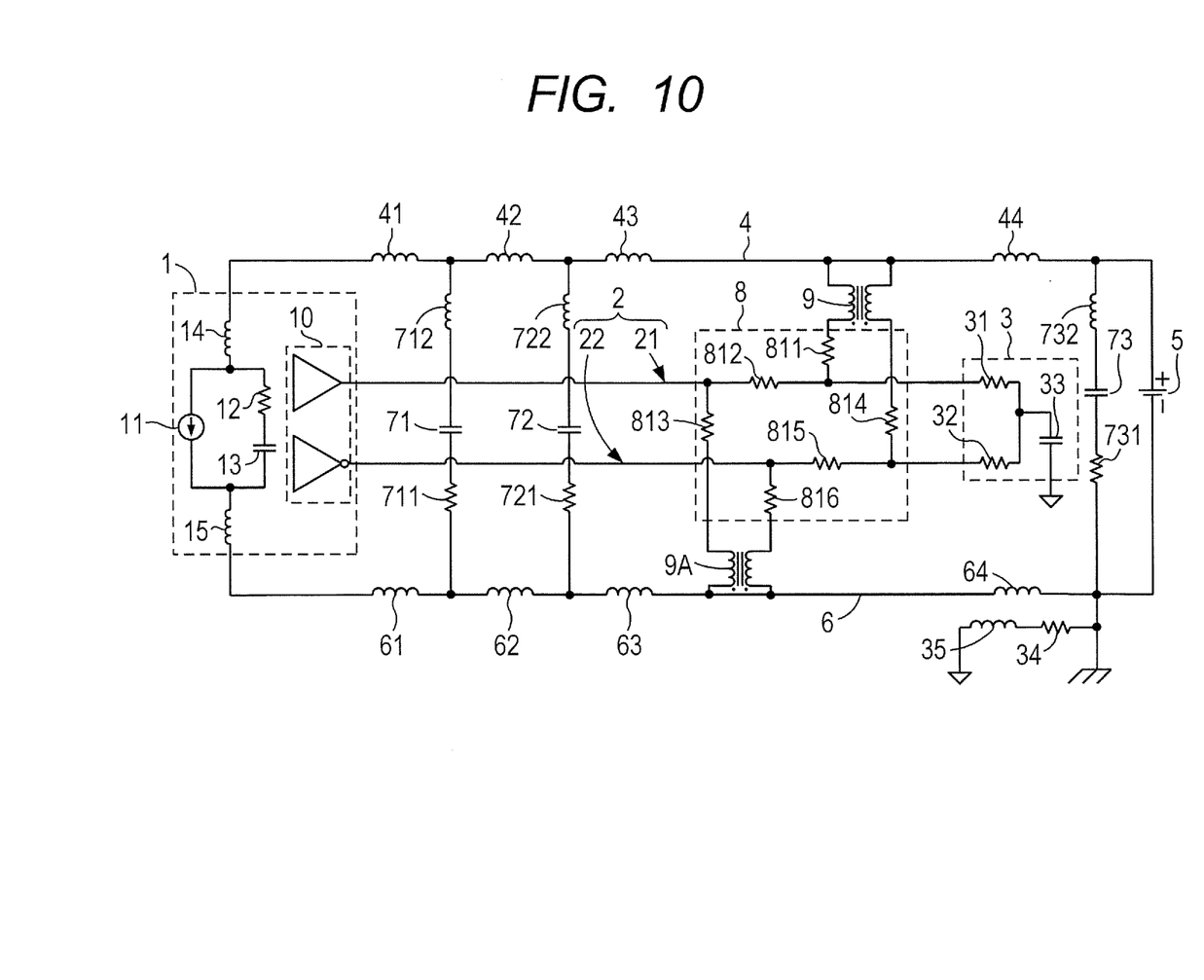
FIG. 10 is an electric circuit diagram showing a circuit model of an electronic apparatus of example 3.

FIG. 10 is an electric circuit diagram showing a circuit model of an electronic apparatus of example 3. The circuit model of example 3 is a result of modeling an electric circuit of the electronic apparatus according to the third embodiment described above. Results of a circuit simulation performed using the circuit model shown in FIG. 10 will be described below. HSPICE was used for the simulation, as in the case of example 1. Regarding the configuration of the circuit model shown in FIG. 10, only the differences from the configuration of the circuit model shown in FIG. 6 will be described.

In example 3, the parasitic inductances 41, 42, and 44 of the power source line 4 as well as the parasitic inductances 61, 62, 63 and 64 of the ground line 6 were modeled assuming that both the power source line 4 and ground line 6 were formed as wiring patterns.

Figure 11A:
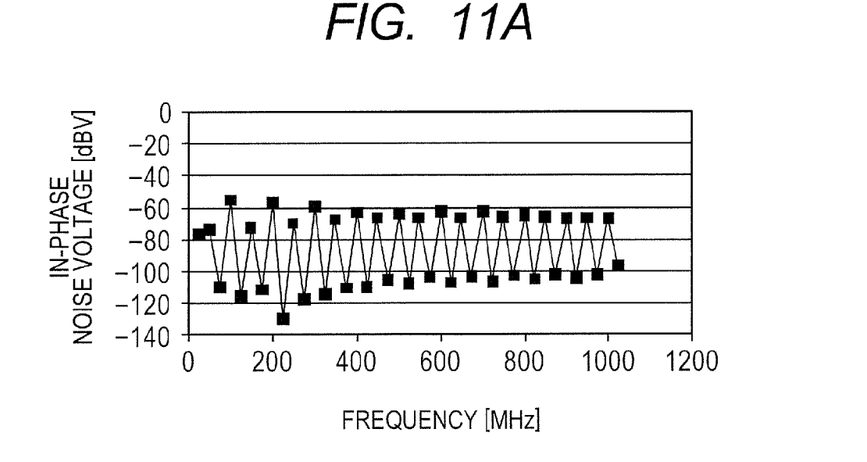
FIGS. 11A and 11B are graphs showing in-phase noise voltage vs. frequency in the circuit model of example 3.
Figure 11B:
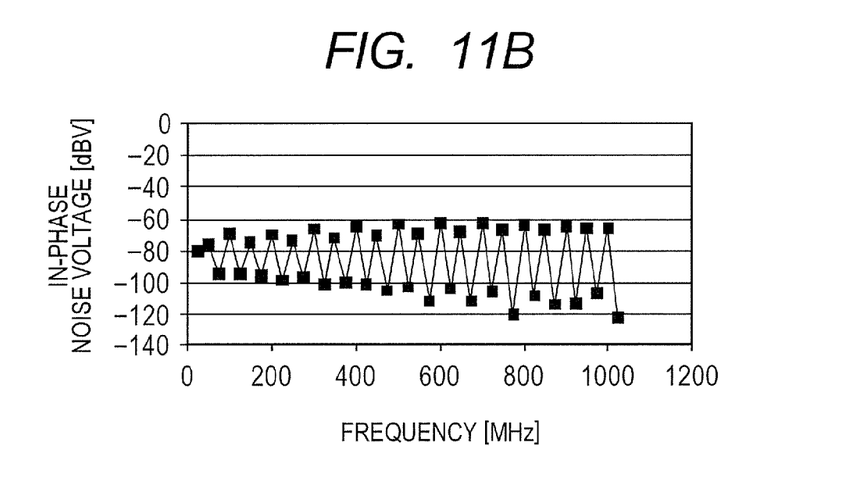

In the circuit model, voltage spectra of in-phase components appearing on the differential signal line 2 were compared between when the common mode choke coils 9 and 9A shown in FIG. 10 were installed and when the common mode choke coils 9 and 9A shown in FIG. 10 were not installed. Results are shown in FIGS. 11A and 11B, in which the abscissa represents the frequency while the ordinate represents the noise voltage of the in-phase component in the resistors 31 and 32. FIG. 11A shows results obtained when the common mode choke coils 9 and 9A were not installed and FIG. 11B shows results obtained when the common mode choke coils 9 and 9A were installed. When the common mode choke coils 9 and 9A were installed, peaks of power source noise at integral multiples of 100 MHz were reduced by approximately 10 dB.

It should be noted that the present invention is not limited to the embodiments and examples described above and that many variations will be made by those skilled in the art without departing from the spirit and scope of the present invention.

Although in the first to fourth embodiments described above, the level shift circuit and common mode choke coil of the differential transmission circuit are mounted on the first printed circuit board, the present invention is also applicable when the level shift circuit and common mode choke coil are mounted on the second printed circuit board.

Also, although in the first to fourth embodiments described above, the direct-current voltage level of the differential signal is stepped up from the first direct-current voltage level into the second direct-current voltage level in each resistor group of the level shift circuit, the present invention is also applicable when the direct-current voltage level is stepped down.

Also, although in the first to fourth embodiments described above, each resistor group is made up of three resistive elements connected in series, this is not restrictive and each resistor group can be made up of at least three resistive elements connected in series. That is, each resistor group may further include another resistive element in addition to the three resistive elements to adjust the voltage levels obtained by voltage division.

Also, although in the first to fourth embodiments described above, the direct-current power source circuits are not mounted on the printed circuit boards, the direct-current power source circuits may be mounted on the printed circuit boards.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A differential transmission circuit for transmitting a differential signal including first and second signals of phases opposite to each other from a transmitting circuit to a receiving circuit, comprising:
   a differential signal line including a first signal line for transmitting the first signal and a second signal line for transmitting the second signal, wherein
      the first signal line comprises first signal and second signal wiring patterns, connected mutually through a first resistive element, and
      the second signal line comprises third and fourth signal wiring patterns, connected mutually through a fourth resistive element;
   a power source line for supplying a source potential to the transmitting circuit and the receiving circuit;
   a ground line for supplying a ground potential to the transmitting circuit and the receiving circuit; and
   a first common mode choke coil including first and second coil units magnetically coupled to each other,
   wherein
   one end of a third resistive element is connected to a first node on the first signal wiring pattern,
   one end of a second resistive element is connected to a second node on the second signal wiring pattern,
   one end of a sixth resistive element is connected to a third node on the third signal wiring pattern,
   one end of a fifth resistive element is connected to a fourth node on the fourth signal wiring pattern,
   the other end of the third resistive element and the other end of the sixth resistive element are connected to the ground line, and
   the other end of the second resistive element and the fifth resistive element are connected to the power source line via the first common mode choke coil.

2. The differential transmission circuit according to claim 1, wherein
   the second resistive element, the first resistive element and the third resistive element are arranged in series with each other, to form a first resistor group,
   the fifth resistive element, the fourth resistive element and the sixth resistive element are arranged in series with each other, to form a second resistor group,
   the first resistor group and the second resistor group are connected in parallel between the power source line and the ground line, so as to form a level shift circuit, and
   the level shift circuit and the power source line are connected via the first common mode choke coil.

3. A differential transmission circuit for transmitting a differential signal including first and second signals of phases opposite to each other from a transmitting circuit to a receiving circuit, comprising:
   a differential signal line including a first signal line for transmitting the first signal and a second signal line for transmitting the second signal, wherein
      the first signal line comprises first signal and second signal wiring patterns, connected mutually through a first resistive element, and
      the second signal line comprises third and fourth signal wiring patterns, connected mutually through a fourth resistive element;
   a power source line for supplying a source potential to the transmitting circuit and the receiving circuit;
   a ground line for supplying a ground potential to the transmitting circuit and the receiving circuit; and
   a first common mode choke coil including first and second coil units magnetically coupled to each other,
   wherein
   one end of a third resistive element is connected to a first node on the first signal wiring pattern,
   one end of a second resistive element is connected to a second node on the second signal wiring pattern,
   one end of a sixth resistive element is connected to a third node on the third signal wiring pattern,
   one end of a fifth resistive element is connected to a fourth node on the fourth signal wiring pattern,
   the other end of the second resistive element and the other end of the fifth resistive element are connected to the power source line, and
   the other end of the third resistive element and the other end of the sixth resistive element are connected to the ground line via the first common mode choke coil.

4. The differential transmission circuit according to claim 3, wherein
   the second resistive element, the first resistive element and the third resistive element are arranged in series with each other, to form a first resistor group,
   the fifth resistive element, the fourth resistive element and the sixth resistive element are arranged in series with each other, to form a second resistor group,
   the first resistor group and the second resistor group are connected in parallel between the power source line and the ground line, so as to form a level shift circuit, and
   the level shift circuit and the ground line are connected via the first common mode choke coil.

5. A differential transmission circuit for transmitting a differential signal including first and second signals of phases opposite to each other from a transmitting circuit to a receiving circuit, comprising:
   a differential signal line including a first signal line for transmitting the first signal and a second signal line for transmitting the second signal, wherein
      the first signal line comprises first signal and second signal wiring patterns, connected mutually through a first resistive element, and
      the second signal line comprises third and fourth signal wiring patterns, connected mutually through a fourth resistive element;
   a power source line for supplying a source potential to the transmitting circuit and the receiving circuit;
   a ground line for supplying a ground potential to the transmitting circuit and the receiving circuit;
   a first common mode choke coil including first and second coil units magnetically coupled to each other; and
   a second common mode choke coil including third and fourth coil units magnetically coupled to each other,
   wherein
   one end of a third resistive element is connected to a first node on the first signal wiring pattern,
   one end of a second resistive element is connected to a second node on the second signal wiring pattern,
   one end of a sixth resistive element is connected to a third node on the third signal wiring pattern,
   one end of a fifth resistive element is connected to a fourth node on the fourth signal wiring pattern,
   the other end of the second resistive element and the fifth resistive element are connected to the power source line via the first common mode choke coil, and the other end of the third resistive element and the sixth resistive element are connected to the ground line via the second common mode choke coil.

6. The differential transmission circuit according to claim 5, wherein
the second resistive element, the first resistive element and the third resistive element are arranged in series with each other, to form a first resistor group,
the fifth resistive element, the fourth resistive element and the sixth resistive element are arranged in series with each other, to form a second resistor group,
the first resistor group and the second resistor group are connected in parallel between the power source line and the ground line, so as to form a level shift circuit,
the level shift circuit and the power source line are connected via the first common mode choke coil, and
the level shift circuit and the ground line are connected via the second common mode choke coil.

7. An electronic apparatus comprising:
a transmitting circuit;
a receiving circuit;
a differential signal line for transmitting a differential signal including first and second signals of phases opposite to each other from the transmitting circuit to the receiving circuit through a first signal line and a second signal line, wherein
the first signal line comprises first and second signal wiring patterns, connected mutually through a first resistive element, and
the second signal line comprises third and fourth signal wiring patterns, connected mutually through a fourth resistive element;
a power source line for supplying a source potential to the transmitting circuit and the receiving circuit;
a ground line for supplying a ground potential to the transmitting circuit and the receiving circuit; and
a first common mode choke coil including first and second coil units magnetically coupled to each other,
wherein
one end of a third resistive element is connected to a first node on the first signal wiring pattern,
one end of a second resistive element is connected to a second node on the second signal wiring pattern,
one end of a sixth resistive element is connected to a third node on the third signal wiring pattern,
one end of a fifth resistive element is connected to a fourth node on the fourth signal wiring pattern,
the other end of the third resistive element and the other end of the sixth resistive element are connected to the ground line, and
the other end of the second resistive element and the other end of the fifth resistive element are connected to the ground line via the first common mode choke coil.

8. An electronic apparatus comprising:
a transmitting circuit;
a receiving circuit;
a differential signal line for transmitting a differential signal including first and second signals of phases opposite to each other from the transmitting circuit to the receiving circuit through a first signal line and a second signal line, wherein
the first signal line comprises first and second signal wiring patterns, connected mutually through a first resistive element, and
the second signal line comprises third and fourth signal wiring patterns, connected mutually through a fourth resistive element;
a power source line for supplying a source potential to the transmitting circuit and the receiving circuit;
a ground line for supplying a ground potential to the transmitting circuit and the receiving circuit; and
a first common mode choke coil including first and second coil units magnetically coupled to each other,
wherein
one end of a third resistive element is connected to a first node on the first signal wiring pattern,
one end of a second resistive element is connected to a second node on the second signal wiring pattern,
one end of a sixth resistive element is connected to a third node on the third signal wiring pattern,
one end of a fifth resistive element is connected to a fourth node on the fourth signal wiring pattern,
the other end of the second resistive element and the other end of the fifth resistive element are connected to the power source line, and
the other end of the third resistive element and the other end of the sixth resistive element are connected to the ground line via the first common mode choke coil.

9. An electronic apparatus comprising:
a transmitting circuit;
a receiving circuit;
a differential signal line for transmitting a differential signal including first and second signals of phases opposite to each other from the transmitting circuit to the receiving circuit through a first signal line and a second signal line, wherein
the first signal line comprises first and second signal wiring patterns, connected mutually through a first resistive element, and
the second signal line comprises third and fourth signal wiring patterns, connected mutually through a fourth resistive element;
a power source line for supplying a source potential to the transmitting circuit and the receiving circuit;
a ground line for supplying a ground potential to the transmitting circuit and the receiving circuit;
a first common mode choke coil including first and second coil units magnetically coupled to each other; and
a second common mode choke coil including third and fourth coil units magnetically coupled to each other,
wherein
one end of a third resistive element is connected to a first node on the first signal wiring pattern,
one end of a second resistive element is connected to a second node on the second signal wiring pattern,
one end of a sixth resistive element is connected to a third node on the third signal wiring pattern,
one end of a fifth resistive element is connected to a fourth node on the fourth signal wiring pattern,
the other end of the second resistive element and the other end of the fifth resistive element are connected to the power source line via the first common mode choke coil, and
the other end of the third resistive element and the other end of the sixth resistive element are connected to the ground line via the second common mode choke coil.

* * * * *